United States Patent
Khalifeh et al.

(10) Patent No.: US 10,229,599 B2
(45) Date of Patent: Mar. 12, 2019

(54) VEHICLE LANE CHANGING

(71) Applicant: Ford Global Technologies, LLC, Dearborn, MI (US)

(72) Inventors: Ahmad Khalifeh, Dearborn, MI (US); Shane Elwart, Ypsilanti, MI (US); Mark Douglas Malone, Canton, MI (US); Levasseur Tellis, Southfield, MI (US); Shadi Jammoul, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/409,729

(22) Filed: Jan. 19, 2017

(65) Prior Publication Data

US 2018/0204463 A1    Jul. 19, 2018

(51) Int. Cl.
| | | |
|---|---|---|
| *B62D 6/00* | (2006.01) | |
| *G05D 1/02* | (2006.01) | |
| *G08G 1/16* | (2006.01) | |
| *B62D 15/02* | (2006.01) | |
| *B60W 30/08* | (2012.01) | |
| *G06K 9/00* | (2006.01) | |

(52) U.S. Cl.
CPC ............ *G08G 1/167* (2013.01); *B60W 30/08* (2013.01); *B62D 6/001* (2013.01); *B62D 15/025* (2013.01); *B62D 15/029* (2013.01); *B62D 15/0255* (2013.01); *G08G 1/166* (2013.01); *G05D 1/0257* (2013.01); *G06K 9/00798* (2013.01); *G06K 9/00825* (2013.01)

(58) Field of Classification Search
None
See application file for complete search history.

(56) References Cited

U.S. PATENT DOCUMENTS

| | | | | |
|---|---|---|---|---|
| 6,151,539 | A | * | 11/2000 | Bergholz ............. G01S 13/931 340/435 |
| 8,244,408 | B2 | | 8/2012 | Lee et al. |
| 8,538,785 | B2 | * | 9/2013 | Coleman ............... G06Q 40/08 705/4 |
| 9,475,491 | B1 | | 10/2016 | Nagasaka et al. |
| 9,623,905 | B2 | * | 4/2017 | Shashua ................ G01C 21/32 |
| 9,852,554 | B2 | * | 12/2017 | Nix ......................... G07C 5/008 |
| 10,034,066 | B2 | * | 7/2018 | Tran ........................ H04Q 9/00 |
| 10,046,229 | B2 | * | 8/2018 | Tran ...................... H04W 4/027 |

(Continued)

FOREIGN PATENT DOCUMENTS

| | | | |
|---|---|---|---|
| CN | 104943747 A * | 9/2015 | ........... B60W 30/12 |
| DE | 102004028613 A1 | 12/2005 | |

(Continued)

OTHER PUBLICATIONS

Chinese Patent Application Pub. No. CN104943747 B to Temple Zewu english translation from google patents.*

(Continued)

*Primary Examiner* — Jean Paul Cass
(74) *Attorney, Agent, or Firm* — Frank A. MacKenzie; Bejin Bieneman PLC

(57) ABSTRACT

A computer is programmed to score a requested vehicle lane change and actuate vehicle components to perform the lane change upon determining that the score is less than a predetermined threshold within the predetermined time.

17 Claims, 5 Drawing Sheets

(56) References Cited

U.S. PATENT DOCUMENTS

| | | | |
|---|---|---|---|
| 2008/0033614 A1 | 2/2008 | Schiehlen et al. | |
| 2009/0212930 A1* | 8/2009 | Pfeiffer | B60Q 9/008 340/435 |
| 2009/0284361 A1* | 11/2009 | Boddie | B60Q 9/008 340/439 |
| 2010/0042315 A1* | 2/2010 | Ikeuchi | G01C 21/32 701/532 |
| 2010/0228419 A1 | 9/2010 | Lee et al. | |
| 2011/0241862 A1* | 10/2011 | Debouk | B60W 50/038 340/439 |
| 2015/0235140 A1 | 8/2015 | Rothermel | |
| 2016/0001776 A1* | 1/2016 | Kim | B60W 10/06 701/96 |

FOREIGN PATENT DOCUMENTS

| | | |
|---|---|---|
| DE | 102012216422 A1 | 3/2014 |
| DE | 102014012781 A1 | 3/2016 |
| WO | WO 2015102275 A1 | 7/2015 |
| WO | 2016135049 A1 | 9/2016 |

OTHER PUBLICATIONS

Search Report from United Kingdom Intellectual Property Office dated Jun. 29, 2018 regarding GB Application No. 1800806.0 (4 pages).

* cited by examiner

VEHICLE LANE CHANGING

BACKGROUND

When a vehicle changes its driving lane, there is often a risk of a collision with an object, e.g., another vehicle. A driver of the vehicle may initiate a lane change without recognizing or attempting to mitigate a collision risk, e.g., another vehicle is in a blind spot of the driver. In another example, a vehicle driver may initiate a lane change without even attempting to verify that a lane change is safe.

DETAILED DESCRIPTION

Introduction

Figure 1:
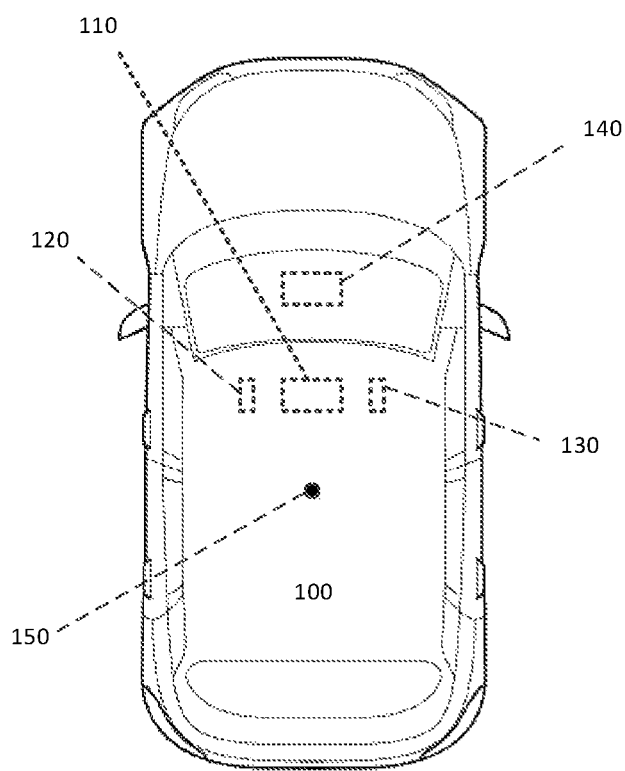
FIG. 1 is a diagram illustrating an example vehicle.
Figure 2:
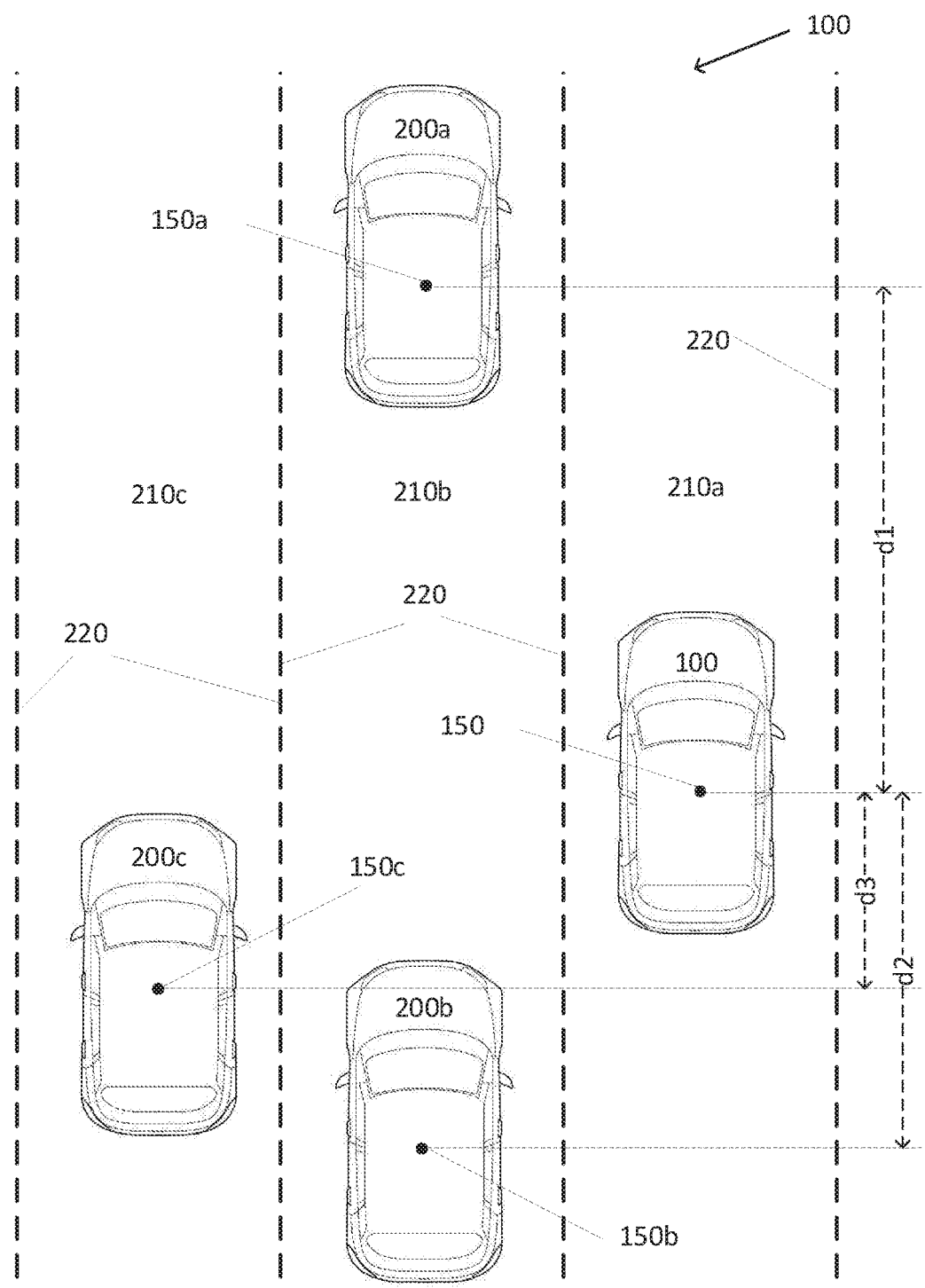
FIG. 2 is a diagram showing an example of multiple vehicles driving in multiple lanes.

Referring to FIGS. 1-2, a computer 110 is programmed to determine a score for a host vehicle 100 lane change to be performed within a predetermined time. Upon determining that the score is less than a predetermined threshold within the predetermined time, the computer 110 can then actuate components of the vehicle 100 to perform the lane change. The vehicle 100 may be referred to as a first or host vehicle 100 and a vehicle 200 other than the host vehicle 100 may be referred to as a second vehicle 200a, 200b, 200c.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a user interface 140. A vehicle 100 has a geometrical center point 150, e.g., points at which respective longitudinal and lateral center lines of the vehicle 100 intersect. With respect to FIG. 2, a vehicle 200a, 200b, 200c may have a geometrical center point 150a, 150b, 150c.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a user interface 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles 200, e.g., via a vehicle-to-vehicle communication network. The V-to-V communication network represents one or more mechanisms by which the computers 110 of vehicles 100 may communicate with other vehicles 200, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. For example, in a semi-autonomous mode, the computer 110 may actuate a steering actuator 120 to change a vehicle lane upon receiving a user request from a human operator to change the lane (see FIG. 2).

The sensors 130 may include a variety of devices known to provide data to the computer 110. For example, the sensors 130 may include Light Detection And Ranging (LIDAR) sensor(s) 130 disposed on a top of the vehicle 100 that provide relative locations, sizes, and shapes of the second vehicles 200 surrounding the vehicle 100, including the second vehicles 200 travelling next to or behind the vehicle 100 (see FIG. 2). As another example, one or more radar sensors 130 fixed to vehicle 100 bumpers may provide locations of the second vehicles 200 travelling in front and/or rear of the vehicle 100, relative to the location of the vehicle 100. The sensors 130 may include camera sensor(s) 130, e.g. front view, side view, etc., providing images from an area surrounding the vehicle 100. For example, the computer 110 may be programmed to receive image data from the camera sensor(s) 130 and to implement image processing techniques to detect lane marking(s) 220, lane(s) 210a, 210b, 210c, and other objects such as vehicles 200. The computer 110 may be further programmed to determine a current driving lane 210a of the vehicle 100, e.g., based on GPS coordinates and/or detected lane markings 220. Based on data received from the sensors 130, the computer 110 may determine a relative distance $d_1$, $d_2$, $d_3$, speed, etc. of other vehicles 200 relative to the vehicle 100. As another example, the computer 110 may be programmed to receive data including relative speed, location coordinates, and/or direction of other vehicles 200 via the wireless communication network. For example, the computer 110 may receive such data from GPS sensors disposed in other vehicles 200 that provides geographical coordinates, movement direction, etc., of the second vehicles 200.

The user interface device(s) 140 may be configured to receive information from a user, such as a human operator, during operation of the vehicle. Moreover, a user interface device 140 may be configured to present information to the user. Thus, a user interface device 140 may be located in the passenger compartment of the vehicle 100. For example, the user interface device(s) 140 may include a turn signal switch. In an example non-autonomous mode, the computer 110 may receive a request to change the lane 210, e.g., a turn left signal to indicate an intention of vehicle 100 user to change from a current lane 210a to a target lane 210b. In an example semi-autonomous mode, the computer 110 may be programmed to perform the lane change upon receiving a request from the user, e.g., via the turn signal switch. In other words, the computer 110 may be programmed to execute a lane change but only if a vehicle 100 user requests a change of the current lane 210a.

Figure 3A:
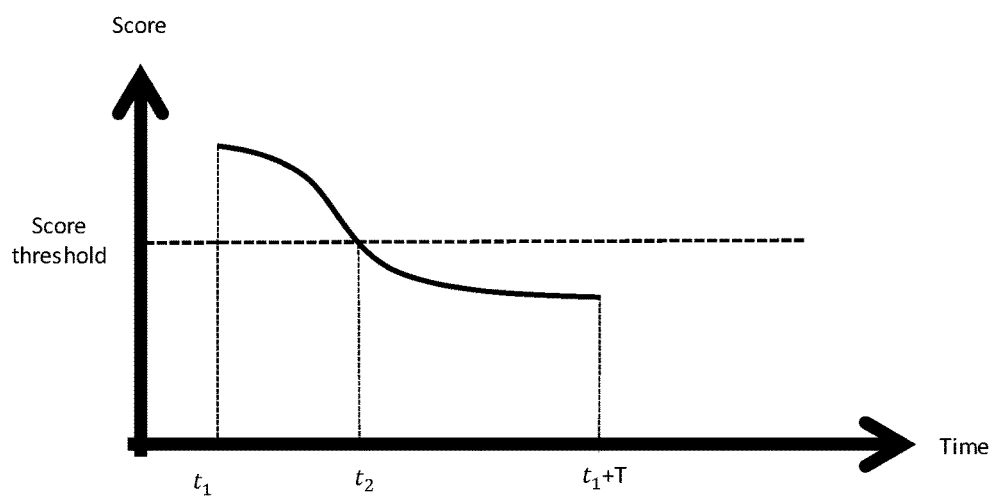
FIGS. 3A-3B are an exemplary graph of determined scores for changing a lane of the vehicle of FIG. 1.

Referring now to FIGS. 2 and 3A, a vehicle 100 computer 110 can be programmed to determine a score of a requested or possible host vehicle 100 lane change, e.g., from the lane 210a to the lane 210b, to be performed within a predetermined time T, e.g., 10 seconds (see FIG. 3A). Upon determining that the score is less than a predetermined threshold within the predetermined time T, e.g., at a time $t_2$, the computer 110 then actuates components of the vehicle 100, e.g., the steering actuator 120, to perform the lane change.

For example, the computer 110 may perform the lane change by outputting instructions to the vehicle 100 steering actuator(s) 120 to move laterally from the current lane 210a to the lane 210b. In one example, the computer 110 may determine an instruction to the steering actuator(s) 120 based on data received from vehicle 100 sensors 130, other vehicles 200 via a wireless communication network, a remote computer, etc. An instruction to the steering actuator(s) 120 may include a steering angle change, e.g., 30 degrees, a torque value, e.g., 1 Nm (Newton Meter), and/or an electrical current value, e.g., 1 Ampere. Additionally or alternatively, the computer 110 may actuate the vehicle 100 turn signals and/or output data via a vehicle 100 wireless communication network interface to indicate a change of lane 210 of the host vehicle 100 to other vehicle(s) 200. The outputted data from the vehicle 100 via the wireless network may for example include an identifier of the vehicle 100, a current lane 210a, a target lane 210b, an expected time duration of lane change operation, e.g., 4 seconds, and/or speed of the vehicle 100. Additionally, the computer 110 may be programmed to turn off the vehicle 100 turn signal lights upon completion of the lane change. For example, the computer 110 may determine that the lane change is completed when the vehicle 100 location, e.g., based on GPS coordinates and map data, is determined to be within a predetermined distance, e.g., 50 cm, of a middle of the target lane 210b such as a virtual line located in parallel and in middle of adjacent lane markings 220 on both sides of the lane 210b.

Figure 3B:
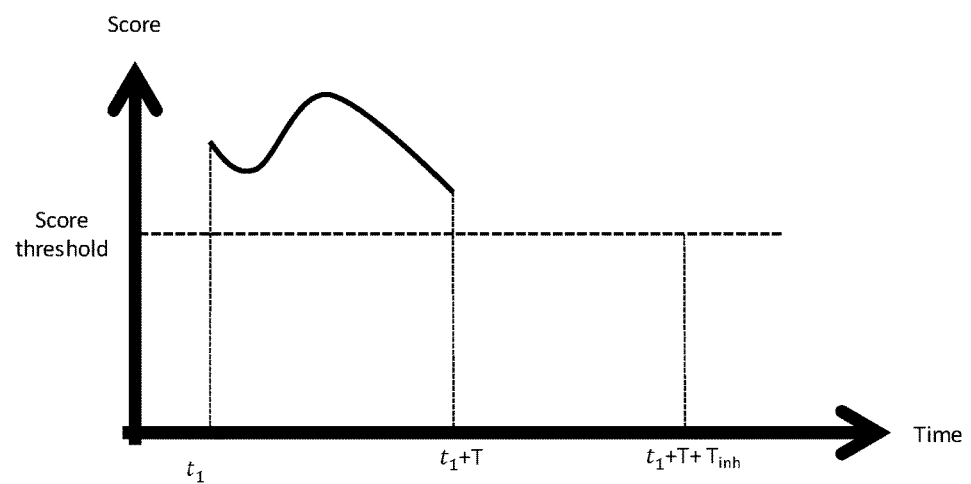

In one example, the computer 110 may be programmed to determine the score upon receiving user request at time $t_1$ indicating the lane change. A user request may include an activation of a vehicle 100 turn signal switch. In another example, the user request may include inputs received from a touch screen user input 140, a voice command, e.g., "change to adjacent left lane". In another example, the computer 110 may determine a target lane 210b based on the current lane 210a and a user request indicating changing one lane to left. In one example, upon receiving the user input, the computer 110 may be programmed to periodically, e.g., every 50 milliseconds, determine the score for the predetermined time T. In other words, the computer 110 continues to score a lane change operation from time $t_1$ to $t_1$+T periodically. Here should be noted that the scores graphs shown in FIGS. 3A-3B are only for illustrative purposes and the score value can be determined based on any periodic or non-periodic rate.

The score as that term is used herein is a value, e.g., specified by a number, indicating a risk of collision with another object or another vehicle 200. In one example, the score may be assigned to one of a plurality of discrete categories, such as "low", "medium", "high", and "imminent" risk. For example, a score threshold may be categorized as "medium", i.e., the computer 110 may actuate the vehicle 100 actuators 120 to perform a lane change, if the score is "low", i.e., less than a "medium" score threshold. In another example, the score may be defined as numerical percentage value between 0% and 100%. For example, the computer 110 may actuate the vehicle 100 actuators 120 to perform a lane change when the score, e.g. 20%, is less than a score threshold, e.g., 30%.

The computer 110 may determine the score using various techniques. In one example, the computer 110 may determine the score by identifying a target lane 210, e.g., the lane 210b. The computer 110 may then detect, e.g., the vehicles 200a, 200b, 200c, and determine the score based at least in part on the detected vehicles 200a, 200b, 200c. For example, the computer 110 may determine the score based on speed, acceleration, and/or deceleration of the vehicles 200a, 200b. In one example, the computer 110 may determine the score by estimating a risk of a collision of the vehicle 100 with one of the second vehicles 200a, 200b when the vehicle 100 moves laterally to an area between the vehicles 200a, 200b on the lane 210b. Additionally or alternatively, the computer 110 may determine the score based on data received from the vehicle 100 sensors 130, V-to-V communication, etc., indicating whether the second vehicle 200c intends to change to the lane 210b, e.g., an area between the second vehicles 200a, 200b.

In another example, the computer 110 may be programmed to determine the score based on a lane 210 curvature. For example, the computer 110 may determine a "high" risk score, as introduced in example above, when a curvature radius of a lane 210 is less than 250 meters. Additionally or alternatively, the computer 110 may determine a score based at least partially on traffic restrictions, e.g., a "high" risk may be determined for a road section with lane change restrictions. In one example, the computer 110 determines traffic restrictions based on, e.g., image data received from vehicle 100 camera sensors 130 including images of traffic signs, map data received via a wireless communication network, etc. Additionally or alternatively, the computer 110 may determine the score based at least partially on weather conditions, e.g., slippery road, inclement weather condition, etc. Additionally or alternatively, the computer 110 may determine the score based at least partially on outside light conditions, e.g., a lower score may be determined during day light. As another example, the computer 110 may determine the score based on a combination of various parameters such as other vehicles 200 location coordinates, speed, acceleration, etc., weather conditions, outside light conditions, traffic restrictions, etc.

With reference to FIGS. 2 and 3B, the computer 110 may be programmed to prevent a lane change upon determining that the score exceeds a predetermined threshold. For example, as shown in FIG. 3B, the computer 110 may receive a user request for lane change at $t_1$. However, the determined score is above the threshold within entire predetermined time T, e.g., from $t_1$ to $t_1+T$. Thus, the computer 110 may prevent a lane change. Additionally or alternatively, the computer 110 may be programmed to ignore (or inhibit) a user request for the lane change, e.g., for $T_{inh}$ seconds, after an end of the predetermined time T upon determining that the score exceeded the predetermined threshold during the predetermined time T. As one example shown in FIG. 3B, the computer 110 inhibits a lane change from $t_1+T$ to $t_1+T+T_{inh}$, upon determining that the score was above the threshold for the entire time of $t_1+T$ to $t_1+T$. In other words, the computer 110 may ignore any user request for lane change received during the time $t_1+T$ to $t_1+T+T_{inh}$.

Processing

Figure 4:
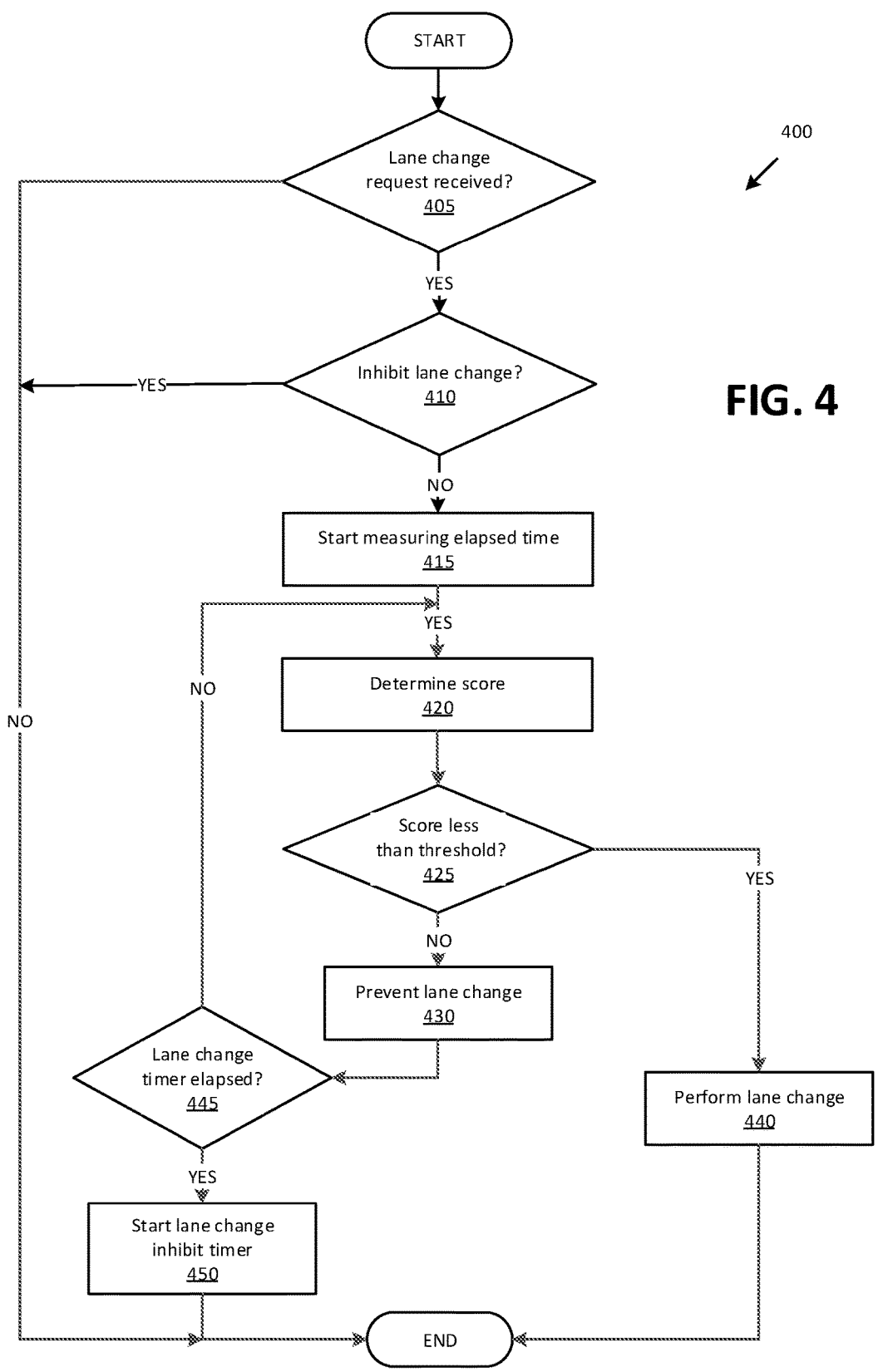
FIG. 4 is a flowchart of an exemplary process for lane changing.

FIG. 4 is a flowchart of an example process 400 for lane changing. Steps of the process 400 described below as executed in a first vehicle 100 computer 110, could alternatively or additionally be executed in one or more other computing devices, e.g., a remote or "cloud" computer.

The process 400 begins in a block 405, in which the computer 110 determines whether a user request for lane change is received, e.g., from the turn signal switch. The received user request may include a direction of lane change, e.g., right or left, and/or a target lane 210, e.g., the lane 210c. If the computer 110 determines that a user request for lane change is received, then the process 400 proceeds to a decision block 410; otherwise the process 400 ends, or, alternatively, the process 400 returns to the decision block 405.

In the decision block 410, the computer 110 determines whether a lane change is to be inhibited. For example, as discussed above with reference to FIG. 3B, a lane change may be inhibited or prevented for a predetermined time $T_{inh}$ starting from $t_1+T$ upon determining that the score was above the threshold in a time interval from $t_1$ to $t_1+T$ after a previous user request was received at time $t_1$. If the computer 110 determines that a lane change is to be inhibited, then the process 400 ends, or, alternatively returns to the decision block 405; otherwise the process 400 proceeds to a block 415.

In the block 415, the computer 110 begins comparing an elapsed time from a time $t_1$ to a predetermined lane change time T. For example, when the user request can be received at a time $t_1$, and then the lane change time is from $t_1$ to $t_1+T$. Additionally, the computer 110 determines the score for lane changing periodically, e.g., every 50 milliseconds.

Next, in a block 420, the computer determines a score for the requested lane change. In one example, the computer 110 is programmed to detect other vehicle(s) 200 and/or objects in other lanes 210, e.g., the vehicles 200a, 200b in the lane 210b, the vehicle 200c in the lane 210c, etc. The computer 110 then scores the requested lane change based at least in part on the detected vehicles 200 and/or objects. In another example, the computer 110 scores the requested lane change based at least in part on traffic restrictions, curvature of the lanes 210, etc.

Next in a decision block 425, the computer 110 determines whether the score for lane changing is less than a score threshold, e.g., as described above. If the computer 110 determines that the determined score, e.g., 20%, is less than the score threshold, then the process 400 proceeds to a block 440; otherwise the process 400 proceeds to a decision block 430.

In the block 430, the computer 110 prevents the lane change. In one example, if a vehicle 100 driver applies a torque to a vehicle 100 steering wheel to cause the vehicle 100 to depart from a current lane 210a, then the computer 110 applies a torque in an opposite direction via a vehicle 100 actuator 120 to prevent a lane departure. Additionally or alternatively, the computer 110 may actuate the vehicle 100 steering actuator 120 to maintain the vehicle 100 lane 210a, e.g., based on a lateral position of the vehicle 100 relative to detected lane markings 220. In another example, the computer 110 may disengage a mechanical linkage of the vehicle 100 steering wheel and the vehicle 100 wheels to prevent a lane change caused by a torque applied, e.g., by a user, to the vehicle 100 steering wheel.

In the block 440, the computer 110 performs the lane change, e.g., by actuating vehicle 100 steering actuators 120. The computer 110 may be programmed to move the vehicle 100 from a current lane 210a to a target lane 210b. Additionally, the computer 110 may be programmed to activate the vehicle 100 turn signal lights to indicate the lane change and/or indicate the lane change by outputting data via the vehicle 100 wireless communication network interface.

In the decision block 445, reached because the risk score was not less than the predetermined threshold, and the computer 110 has thus determined that it cannot make a lane change in the block 425, the computer 110 determines whether the lane change time T is elapsed. For example, the lane change time elapses after reaching a time $t_1+T$, as discussed above. If the computer 110 determines that the lane change time T is elapsed, the process 400 proceeds to a block 450; otherwise the process 400 returns to the decision block 420.

In the block 450, the computer 110 starts a lane change inhibit time $T_{inh}$. In one example, the inhibit time is from $t_1+T$ to $t_1+T+T_{inh}$. Following the block 450, the process 400 may end, or alternatively returns to the decision block 405.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory.

Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, programmed to:
   score a requested vehicle lane change based on a curvature radius of a host vehicle current lane, and at least one of (i) a traffic restriction including a lane change restriction, (ii) a weather condition, and (iii) an outside light condition; and
   actuate vehicle components to perform the lane change upon determining that the score is less than a predetermined threshold within a predetermined time.

2. The computer of claim 1, further programmed to prevent the lane change upon determining that the score exceeds the predetermined threshold.

3. The computer of claim 1, wherein the computer is programmed to determine the score upon receiving user input requesting the lane change.

4. The computer of claim 1, further programmed to ignore a user request for the lane change for a predetermined inhibit time upon determining that the score exceeded the predetermined threshold during the predetermined time.

5. The computer of claim 1, wherein determining the score further includes identifying a target lane for the lane change.

6. The computer of claim 1, further programmed to detect one or more second vehicles and determine the score based at least in part on the detected one or more second vehicles.

7. The computer of claim 1, wherein the vehicle components include a host vehicle steering actuator.

8. The computer of claim 1, further programmed to actuate the vehicle components to perform a lane change by:
   outputting instructions to a vehicle steering actuator; and
   at least one of activating vehicle turn signals and outputting data indicating the lane change via a wireless communication network.

9. A method, comprising:
   scoring a requested vehicle lane change based on a curvature radius of a host vehicle current lane, and at least one of (i) a traffic restriction including a lane change restriction, (ii) a weather condition, and (iii) an outside light condition; and
   actuating vehicle components to perform the lane change upon determining that the score is less than a predetermined threshold within a predetermined time.

10. The method of claim 9, further comprising preventing the lane change upon determining that the score exceeds the predetermined threshold.

11. The method of claim 9, wherein the score is determined upon receiving user input requesting the lane change.

12. The method of claim 11, wherein the score is periodically determined for the predetermined time.

13. The method of claim 9, further comprising ignoring a user request for the lane change for a predetermined inhibit time upon determining that the score exceeded the predetermined threshold during the predetermined time.

14. The method of claim 9, wherein determining the score further includes identifying a target lane for the lane change.

15. The method of claim 9, further comprising detecting one or more second vehicles and determining the score based at least in part on the detected one or more second vehicles.

16. The method of claim 9, wherein the vehicle components include a host vehicle steering actuator.

17. The method of claim 9, wherein actuating the vehicle components to perform the lane change further includes:
   outputting instructions to a vehicle steering actuator; and
   at least one of activating vehicle turn signals and outputting data indicating the lane change via a wireless communication network.

* * * * *